G. F. STARR.
PRUNE TRAY CLEANER AND SACKER.
APPLICATION FILED SEPT. 8, 1920.
1,388,211.
Patented Aug. 23, 1921.
3 SHEETS—SHEET 1.
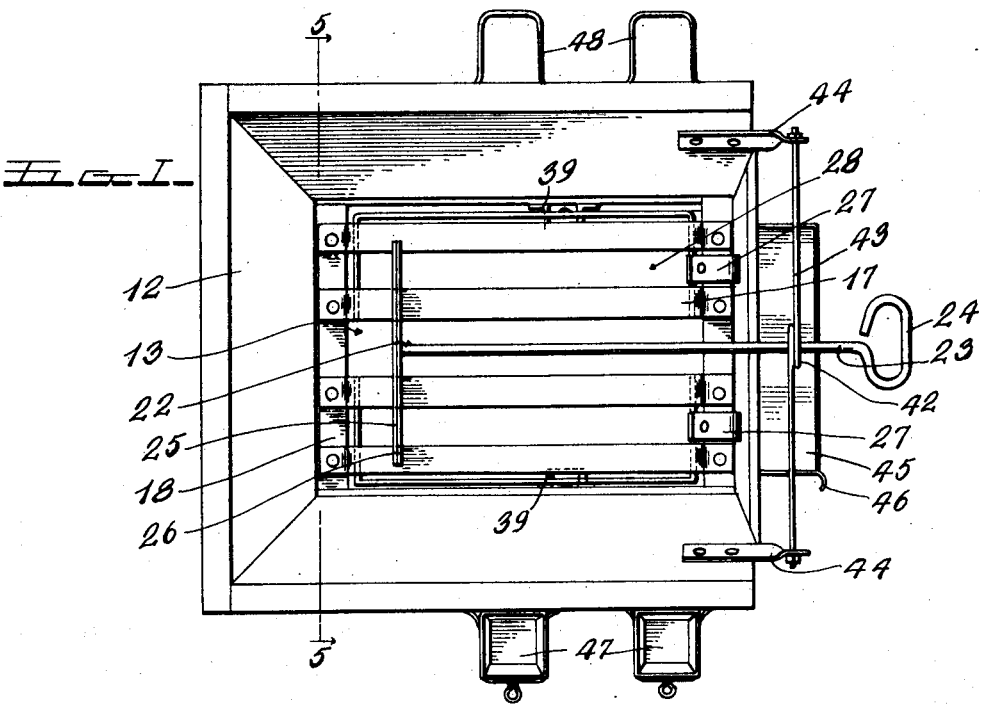
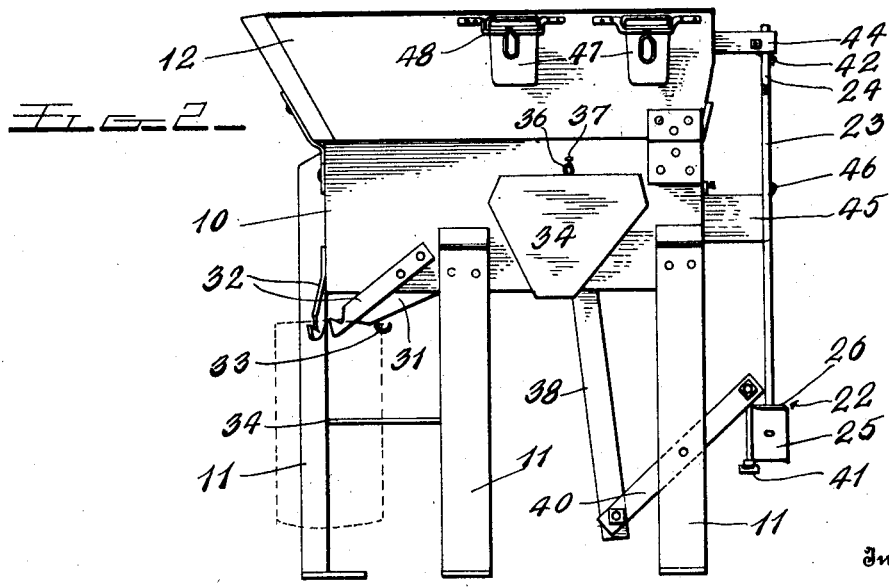
Inventor
George F. Starr

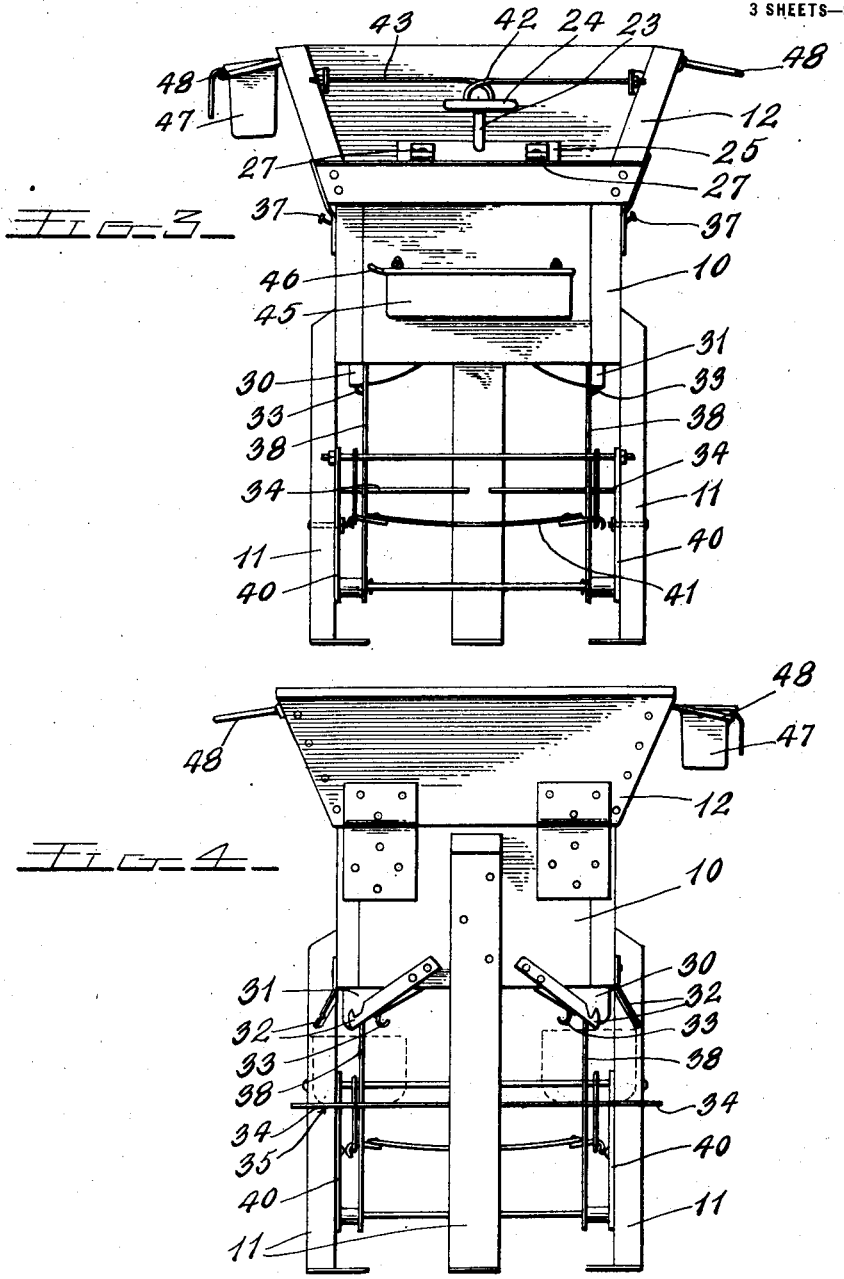

G. F. STARR.
PRUNE TRAY CLEANER AND SACKER.
APPLICATION FILED SEPT. 8, 1920.
1,388,211.
Patented Aug. 23, 1921.
3 SHEETS—SHEET 3.
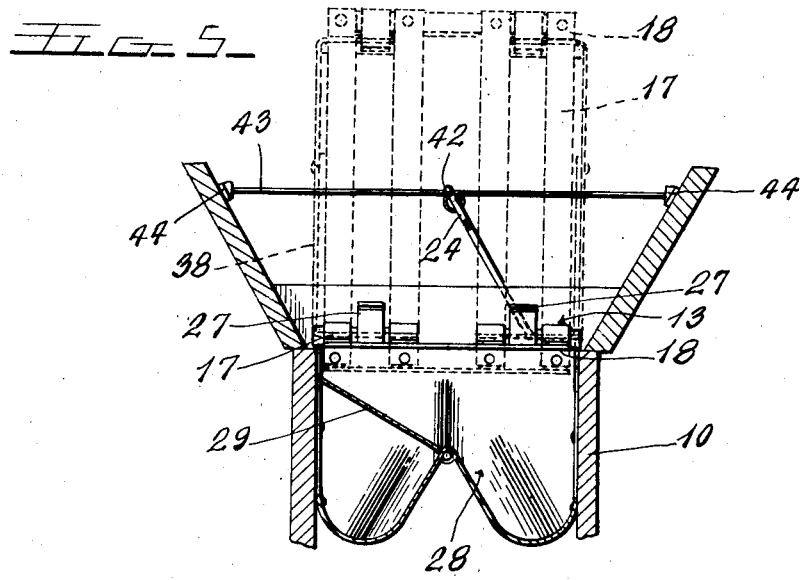
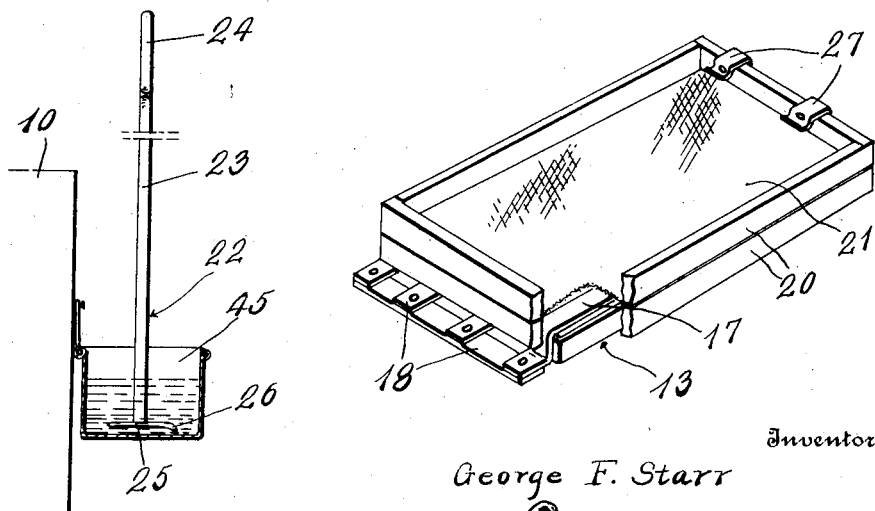
Inventor
George F. Starr
Attorney

UNITED STATES PATENT OFFICE.

GEORGE F. STARR, OF SALEM, OREGON.

PRUNE-TRAY CLEANER AND SACKER.

1,388,211.    Specification of Letters Patent.    Patented Aug. 23, 1921.

Application filed September 8, 1920. Serial No. 408,900.

*To all whom it may concern:*

Be it known that I, GEORGE F. STARR, a citizen of the United States, residing at Salem, in the county of Marion and State of Oregon, have invented certain new and useful Improvements in Prune-Tray Cleaners and Sackers; and I do hereby declare the following to be a full, clear, and exact description of the invention, such as will enable others skilled in the art to which it appertains to make and use the same.

The object of the invention is to provide a comparatively simple and relatively inexpensive machine whereby prunes and other dried fruit and products may be readily removed from the trays upon which they are dried, may be sorted or culled, and may be sacked or boxed with the minimum of handling and of waste and the maximum of efficiency and expedition; and with these objects in view the invention consists in a construction and combination of parts of which a preferred embodiment is shown in the accompanying drawing wherein:

Figure 1 is a plan view of the apparatus showing the tray scraper in its operative position.

Fig. 2 is a side view showing the scraper in its folded or inoperative position.

Figs. 3 and 4 are front and rear end views.

Fig. 5 is a transverse section on the plane indicated by the line 5—5 of Fig. 1, the tray holder being shown in dotted lines in its tilted or tray dumping position.

Fig. 6 is a longitudinal sectional view showing the scraper in its dipping or cleansing position.

Fig. 7 is a detail view in perspective of the tray holder showing a tray fitted thereto and partly broken away.

Within a casing 10 supported for example by legs 11 and having at its top a hopper 12 is arranged a tray holder 13 spanning the interior of the casing and consisting of a tilting frame 17 and supporting bars 18 designed when a drying tray 19 is fitted thereon to support the marginal frame 20 of said tray upon the tilting holder frame while the supporting bars bear against the under side of the screen 21 of the tray and support the same during the operation of the scraper 22 employed for loosening the fruit from the screen to prevent injury of the tray. The scraper consists of a handle or shank 23 provided at one end with a grip 24 and at the other end with a transverse blade 25 of which one edge is forwardly concaved as indicated at 26 to serve as a means of lifting the fruit out of the meshes of the screen forming the body portion or diaphragm of the tray and moving them toward the center of the latter as indicated in Fig. 5. At the front end of the tray holder are arranged the tray holding clips 27 which curve rearwardly and overhang the tray to maintain the latter upon the holder when the latter is tilted or up-ended as shown in dotted lines in Fig. 5 for the purpose of discharging the loosened product into the distributing hopper 28 located in the casing below the tray holder and provided with a hinged deflecting flap 29 adapted to be turned to one side or the other to cause the deflection and feeding of the products toward one or the other of the outlet spouts 30 and 31 adjacent to which are located the sack holding hooks 32 and 33. The hooks 32 are duplicated for each outlet spout to hold the front or outer side of the mouth of the sack as indicated in the drawing and the hook 33 is located inwardly or in rear of the spout and is swiveled so that it may be turned either outwardly or inwardly to suit the size of the sack mouth, it being obvious that the sack may be arranged either inside or outside of the outer sack hooks 32 according to whether it has a mouth of small or large diameter or capacity. Also removable shelves 34 are provided for interchangeable use with the sacks and adapted to be fitted in kerfs or seats 35 in the legs or standards of the apparatus when boxes instead of sacks are to be filled with the product, said shelves having supporting eyes 36 for engagement with suspending hooks 37 on the sides of the casing when not required or when the product is being deposited in sacks for shipment or storage.

In combination with the tray holder, and pivotally connected therewith at its opposite sides, preferably nearer the forward than the rear end thereof, are the vertically movable lifting bars 38 fitted in guides 39 in the casing and connected at their lower ends with tilting levers 40 fulcrumed upon the legs or standards of the frame and connected with a treadle 41, to the end that by pressure of the foot the operator may raise and tilt the tray holder with the tray seated thereon to discharge or dump the loosened prunes or other fruit or products from the tray into the distributing hopper for deposit in the sacks, boxes or other receptacles provided for that purpose. The object in having the deflecting door or flap, obviously, is to enable the operator to deposit different grades of goods in different receptacles as they are presented successively upon the trays arranged in the machine.

The shank or handle of the scraper is preferably supported by a guide 42 formed in a cross bar 43 supported by brackets 44 extending forwardly from the side walls of the receiving hopper 12, said bar being mounted in the brackets for rocking movement to permit of freedom of swinging movement of the scraper as well as longitudinal movement thereof, so that at intervals, within the discretion of the operator, the blade of the scraper may be deposited in a cleansing trough 45 located on the front of the casing and adapted to contain water or other liquid for cleansing purposes. At one end of the trough is arranged a clip 46 with which the shank of the scraper may be engaged as shown in Fig. 2 when not in use and for the purpose of holding the scraper out of the way during the elevation and dumping movement of the tray holder.

Also arranged at the sides of the receiving hopper and exteriorly thereof are the cull boxes 47 into which culls, undesirable and broken fruit, not regarded as first grade or not in perfect condition, may be deposited by the operator, the operation of separating the culls being accomplished manually after the product has been loosened from the tray by means of the scraper which, as will be seen, may be pushed or pulled longitudinally of the tray, inserting the blade into the tray adjacent to an end bar of the frame thereof and moving it longitudinally to loosen the fruit without incurring the liability of causing the sagging or breaking or tearing of the screen of the tray. The cull boxes are movably fitted in keepers 48 extending outwardly from the receiving hopper to permit of displacement to empty the contents thereof.

The legs 10 are provided at their ends with suitable stay irons which are adapted to be bolted or otherwise secured to the floor so that the device will be rigidly held in place.

Having thus described the invention, what I claim is:—

1. An apparatus for the purpose described comprising a tray supporting frame, a drying tray carried by the frame and having a screen portion and relatively elevated supporting bars on the frame for upholding the screen portion of the drying tray.

2. An apparatus for the purpose described comprising a drying tray having a screen portion, a movable frame for supporting the marginal frame of the drying tray, supporting bars offset from the movable frame for upholding the screen portion of the drying tray, and means for tilting the movable frame.

3. An apparatus for the purpose described comprising a movable supporting frame, a drying tray carried by the frame and having a screen portion, offset bars on said frame for upholding the screen portion of the drying tray, clips on said supporting frame for engagement with the drying tray, and means for tilting the supporting frame.

4. An apparatus for the purpose described comprising a tray supporting frame, a drying tray carried by the frame and having a screen portion, lifting bars pivoted to the frame, and a treadle for actuating the bars to tilt the frame.

5. An apparatus for the purpose described comprising a supporting structure, a tray supporting frame associated with said structure, a rocking bar carried by said supporting structure, a guide on said bar, a shank reciprocally mounted in said guide, and a transverse tray scraping blade on said shank.

6. An apparatus for the purpose described having a tray holder, a rinsing trough, a rocking bar provided with an intermediate guide and disposed transversely of the tray holder, and a scraper having a shank reciprocably mounted in said guide and provided with a transverse tray scraping blade adapted for arrangement in said rinsing trough.

7. An apparatus for the purpose described having a receiving hopper, a tray holder movably mounted in said hopper, a distributing hopper provided with an outlet, means for supporting a receptacle adjacent to the outlet from the distributing hopper, cull boxes removably seated upon the receiving hopper and a scraper mounted for reciprocatory movement relative to a tray seated upon the holder.

8. An apparatus for the purpose described having a tray holder, a distributing hopper arranged beneath the holder and provided with a plurality of outlet spouts, a reversible deflecting flap mounted in the hopper for disposition to deflect fruit toward either of said outlet spouts, means adjacent to each spout for supporting a receptacle to be filled, and a tray scraper reciprocably mounted and having a blade for traversing the surface of a tray supported by the holder.

9. An apparatus for the purpose described having a casing provided with an inclosed distributing hopper having a deflecting flap and a plurality of outlet spouts, a tray holder movably and tiltably seated above the distributing hopper, means for tilting the holder, a scraper mounted for reciprocatory movement and having a blade for traversing the surface of a tray supported by the holder, sack supporting hooks arranged adjacent to each outlet spout, and box supporting shelves removably secured to the casing beneath said spouts.

10. An apparatus for the purpose described having a casing provided with an inclosed distributing hopper having a deflecting flap and a plurality of outlet spouts, a tray holder movably and tiltably seated above the distributing hopper, means for tilting the holder, a scraper mounted for reciprocatory movement and having a blade for traversing the surface of a tray supported by the holder, sack supporting hooks arranged adjacent to each outlet spout, and box supporting shelves removably secured to the casing beneath said spouts, said sack supporting hooks consisting of a plurality of exterior and a swiveled interior hook for engagement at spaced points with the mouth of a sack.

In testimony whereof I affix my signature in presence of two witnesses.

GEORGE F. STARR.

Witnesses:
A. O. CONDIT,
F. ETHEL LAW.